UNITED STATES PATENT OFFICE.

FRANK H. JOHNSON, OF FARIBAULT, MINNESOTA.

MOTOR-VEHICLE.

958,501.  Specification of Letters Patent.  Patented May 17, 1910.

Application filed March 11, 1909. Serial No. 482,753.

*To all whom it may concern:*

Be it known that I, FRANK H. JOHNSON, citizen of the United States, residing at Faribault, in the county of Rice and State of Minnesota, have invented certain new and useful Improvements in Motor-Vehicles, of which the following is a specification.

My invention relates to motor vehicles, and consists in the peculiar and advantageous construction hereinafter described and claimed.

Figure 1:
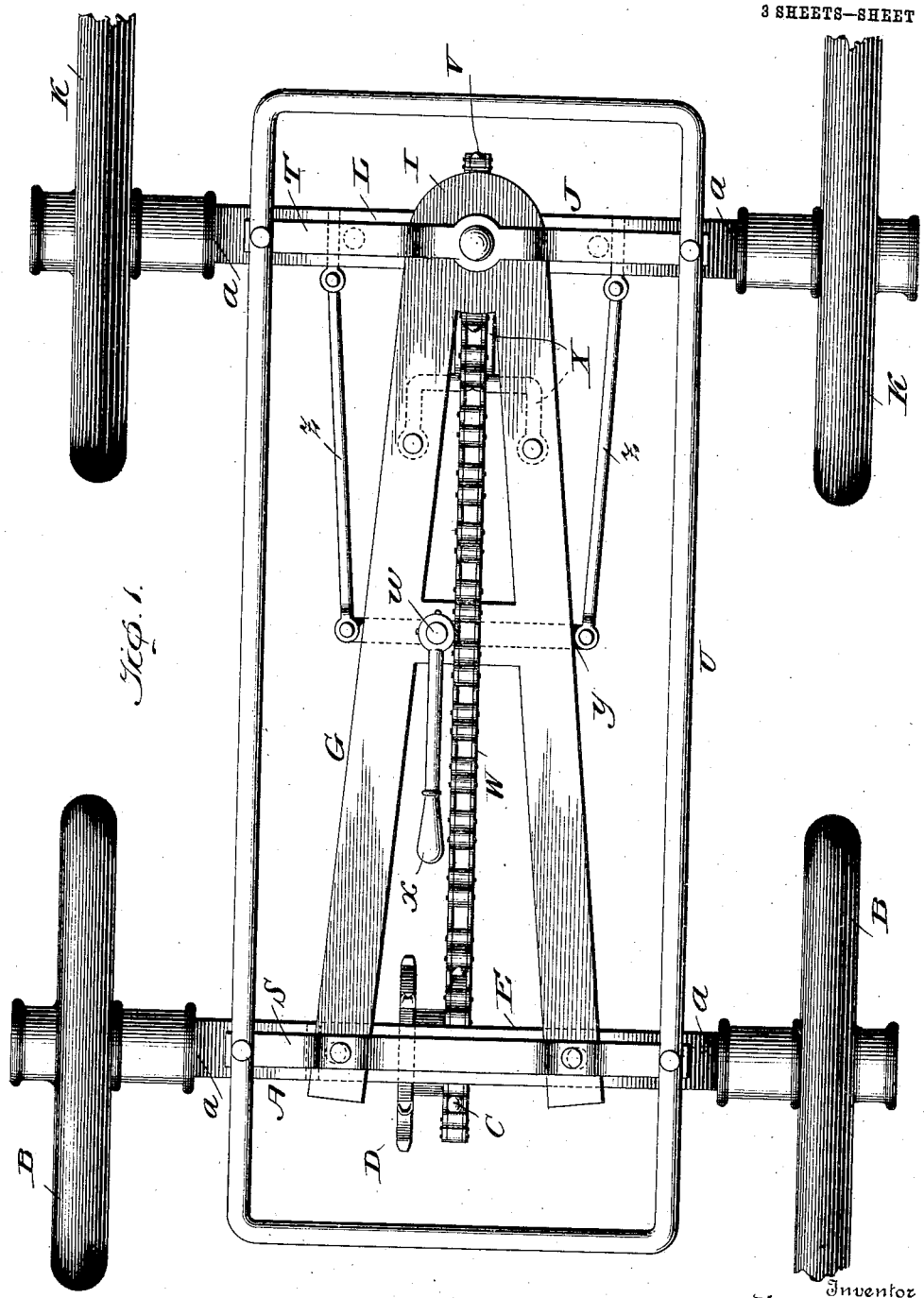
Figure 2:
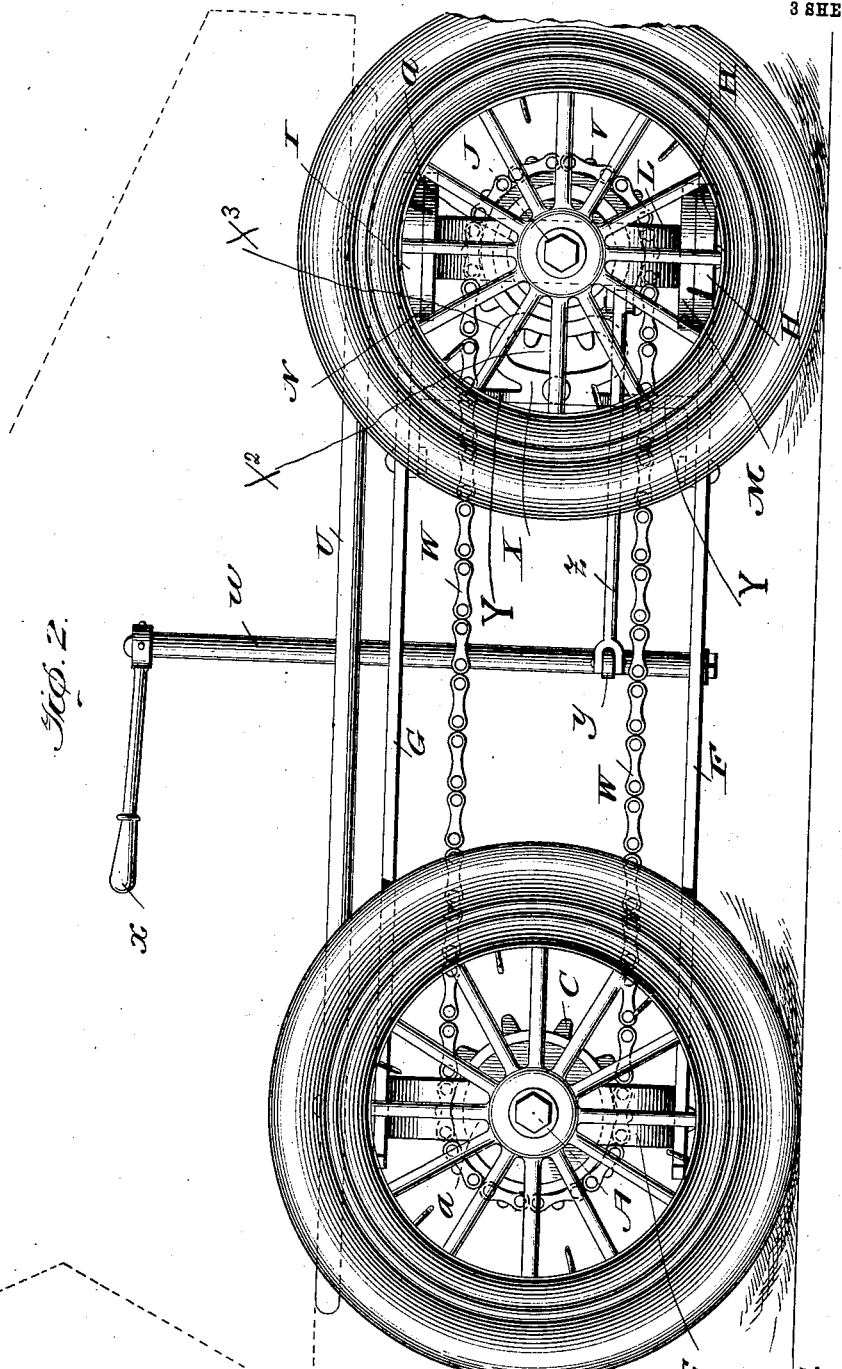
Figure 3:
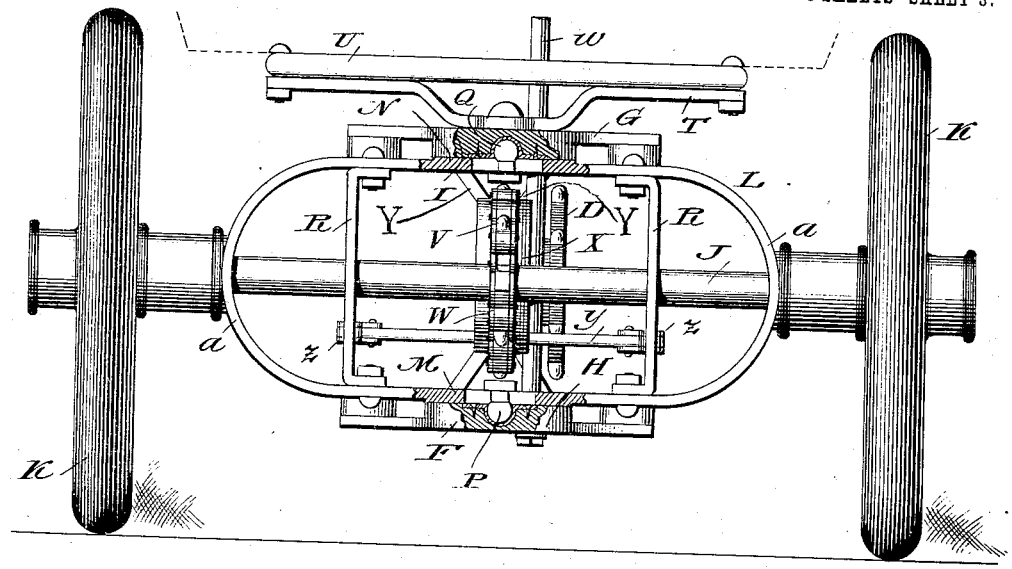
Figure 4:
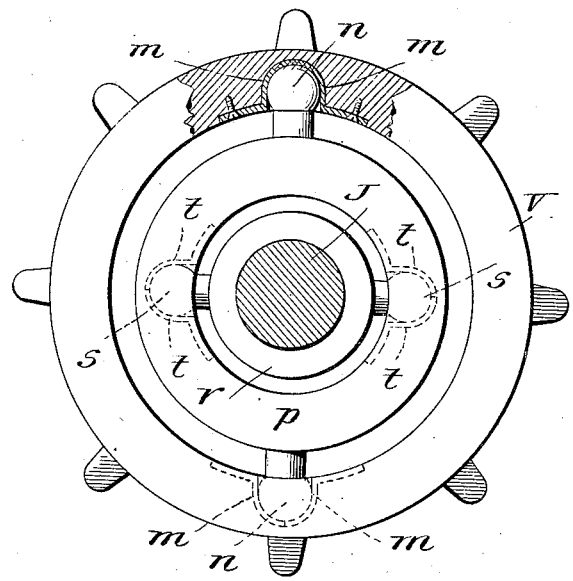

In the drawings, accompanying and forming part of this specification: Figure 1 is a plan view of so much of a motor vehicle or automobile as is necessary to illustrate the best practical embodiment of my invention that I have as yet devised. Fig. 2 is a side elevation of the same. Fig. 3 is a front elevation, with some of the parts in vertical section, showing the front shaft or axle and its appurtenances and also illustrating the parts adjacent thereto. Fig. 4 is an enlarged section, taken through the forward shaft or axle of the vehicle in a plane at one side of the gear appurtenant thereto, and illustrating the manner in which said shaft or axle and gear are coupled or connected together.

Similar letters of reference designate corresponding parts in all of the views of the drawings.

The rear shaft or axle A of my improvements may be of any type consonant with the purpose of my invention, and ground wheels B are suitably attached thereto so that forward rotation of the shaft will be attended by similar motion of the wheels. At or adjacent its middle, the said shaft A is equipped with an element C, preferably a sprocket gear, adapted to form part of a driving connection, presently described; and it is also provided with an auxiliary sprocket gear D, or is otherwise adapted for connection with a suitable motor or driving means (not shown). The shaft A is journaled, at points adjacent the wheels B, in conventional or other suitable anti-friction bearings, in the end portions *a* of a transversely-disposed, upright, open frame E, of general elliptical configuration; the said elliptical frame being preferably of steel possessed of a certain amount of resiliency or springiness, and being provided with horizontal portions arranged below and above the shaft or axle, respectively.

Fixedly connected to and extending forwardly from the lower horizontal portion of the open, elliptical frame E, at opposite sides of the longitudinal median line of the machine, are the lower frame bars F, while fixedly connected to and extending forwardly from the upper horizontal portion of frame E are similar frame bars G. The lower frame bars F are fixed at their forward ends with respect to a plate H which forms the lower member of a lower rocker bearing, presently described, and the forward ends of the upper frame bars G are similarly fixed with respect to a plate I which forms the upper member of an upper rocker bearing, hereinafter specifically referred to.

J is the forward shaft or axle of the vehicle which bears and is adapted to transmit rotary motion to forward wheels K, and is journaled in conventional or any other suitable bearings in the end portions of an open, elliptical, transverse frame L similar in configuration and character to the rear open frame E before described. On its lower horizontal bar or portion the forward transverse frame L is provided with a bearing member M, and on its upper bar or portion said frame L is provided with a bearing member N. The member M is opposed to the main frame member H, while the member N is opposed to the main frame member I, and the frame L has ball and socket pivotal mountings P and Q on the frame members, as illustrated in Fig. 3. It will be observed that the devices, which carry the balls P and Q, pass through slots in the frame members M and N, and said devices are clamped in the slots so as to normally hold the frame L against transverse movement.

When deemed necessary for the sake of rigidity and strength, the rear transverse frame E and the forward transverse frame L may be respectively provided with upright struts R; the said struts being disposed at opposite sides of the middle of their frame in position to receive the adjacent shaft or axle, and being interposed between and fixedly connected to the lower and upper portions of the frame, as best shown in Fig. 3.

Located above the rear transverse frame E and fixedly connected to the main frame bars G and also to the upper portion of said transverse frame E is a transverse bar S, and located above and fixed with respect to the bearing member I is a similar transverse bar T. These bars S and T are for the connection of a rectangular or other suitable frame U with which the body of the vehicle may be connected in any approved or desirable manner. I would have it understood, however, that the bars S and T and the frame U do not form essential features of my invention, and that, therefore, said bars and frame may be dispensed with without involving departure from the spirit of my claimed invention; the body in that case being connected with the described running gear in any suitable manner, compatible with the purposes of my invention.

Surrounding the forward shaft or axle J and connected with the same in the peculiar and advantageous manner hereinafter set forth is a sprocket gear V, and between the sprocket gear C on the rear shaft or axle A and the said sprocket gear V is a sprocket belt W, designed to transmit motion from the shaft A to the shaft J and rotate the latter by the former.

Arranged between and fixedly connected with the lower and upper main frame bars F and G is a guide and holder X which receives the rear portion of the sprocket gear V and has for its office to maintain the gear V in alinement with the gear C and belt W, irrespective of the horizontal swinging of the forward shaft or axle J necessary to steering of the machine, and in that way assure the transmission of uniform power to the foward shaft or axle J and contribute to the traction of the vehicle. The said guide and holder X comprises two parallel sides, and in each of said sides is an opening $X^2$ the forward wall $X^3$ of which is the only part of the side that engages the opposed side of the gear V when the same tends to swing horizontally. The said forward walls $X^3$ of the openings $X^2$ in the sides of the holder and guide X are curved in conformity to and are adapted to engage the portions of the gear V adjacent the toothed periphery thereof, and from this it follows that when the gear V tends to swing horizontally and is prevented by one of the sides of the holder and guide X, the operation will be attended by only a small amount of friction. It will also be observed by reference to the drawings and particularly to Fig. 3, that the arms Y connecting the holder and guide X with the frame bars F and G are divergent from the rear portion of the holder and guide to the said frame bars F and G, and that, therefore, there is no liability of the holder and guide X or its supporting appurtenances interfering with the free passage of the upper and lower stretches of the sprocket belt.

It will be gathered from the foregoing that by virtue of the peculiar specific construction of the guide and holder G, the sprocket gear V is held against swinging movement without material friction, and yet it is not necessary to employ anti-friction rollers or other devices that are liable to break or wear out after a short period of use.

The gear V, see Fig. 4, is in the form of an annulus; and it is provided in its inner side at diametrically opposite points, with rocker bearings $m$. These bearings receive trunnions $n$ on a ring $p$ forming the intermediate member of a universal joint, the inner member $r$ of which is arranged on the shaft or axle J and is provided with trunnions $s$, journaled in rocker bearings $t$ in the said ring or intermediate member $p$, and disposed at right angles to the trunnions $n$. By virtue of this provision it will be manifest that the forward shaft or axle J may be freely swung horizontally in one direction or the other without interrupting or otherwise affecting the continuous transmission of rotary motion to said shaft or axle. It will also be manifest that inasmuch as the gear V is retained in alinement with the gear C and belt W, as before described, the horizontal or vertical swinging movements of the forward shaft or axle J is not attended by the imposition of strain on any of the parts, which is an important desideratum.

Any suitable means may be employed for enabling a driver to move and hold the forward shaft or axle J; the means illustrated comprising an upright rock-shaft $w$, journaled in a suitable bearing in the upper portion of the main frame and equipped with a handle $x$ and a T-head $y$, and rods $z$ extending between and connecting the arms of said lever and the struts R in the forward, transverse frame L. Swinging movements of the handle $x$ will obviously be accompanied by similar movements of the forward shaft or axle J, and in that way the driver is enabled to conveniently steer the vehicle.

In addition to the practical advantages hereinbefore ascribed to my improvements, it will be noted that the said improvements are simple and compact, and light, and are well adapted to withstand the shocks and strains to which the parts of motor vehicles are ordinarily subjected.

As before stated, the construction herein illustrated and described constitutes the best practical embodiment of my invention of which I am aware, but it will be understood that in the future practice of my invention such changes in the form, construction and relative arrangement of parts may be made as do not depart from the spirit of the invention as claimed.

Having thus fully described my invention, what I claim as new, and desire to secure by Letters Patent, is:—

A motor vehicle comprising upper and lower main-frame members, a front transverse frame, of open form, interposed between and pivoted to said frame members, a shaft journaled in the end portions of said transverse frame, ground wheels on said shaft, a sprocket gear surrounding the shaft, a universal joint interposed between the shaft and said gear, a sprocket belt extending around said gear and rearwardly from the same, a vertically-disposed holder and guide located intermediate the lower and upper stretches of said belt and having sides in which are openings and also having the forward walls of said openings integral at both ends with the sides and curved in conformity to and arranged adjacent the sides of the peripheral toothed portion of the sprocket gear, and upper and lower arms integral with and divergent from the rear portion of said holder and guide and fixedly connected to the upper and lower main-frame members.

In testimony whereof I affix my signature in presence of two witnesses.

FRANK H. JOHNSON.

Witnesses:
ROBERT A. BOSWELL,
M. A. BOND.